(12) United States Patent
Cheethirala et al.

(10) Patent No.: US 12,368,717 B1
(45) Date of Patent: Jul. 22, 2025

(54) HIGH AVAILABILITY MULTI-TENANT CLOUD BASED NETWORK ACCESS CONTROL SYSTEM

(71) Applicant: Juniper Networks, Inc., Sunnyvale, CA (US)

(72) Inventors: Madhava Rao Cheethirala, San Jose, CA (US); Natarajan Manthiramoorthy, Fremont, CA (US); Pavan Basetty, Fremont, CA (US); Raja Rao Tadimeti, San Jose, CA (US); Pavan Kumar Venkata Satish Bharathapudi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 177 days.

(21) Appl. No.: 17/933,010

(22) Filed: Sep. 16, 2022

(51) Int. Cl.
*H04L 29/06* (2006.01)
*H04L 9/40* (2022.01)
*H04L 67/1097* (2022.01)

(52) U.S. Cl.
CPC .......... *H04L 63/102* (2013.01); *H04L 63/104* (2013.01); *H04L 67/1097* (2013.01)

(58) Field of Classification Search
CPC .. H04L 63/104; H04L 67/1097; H04L 63/102
See application file for complete search history.

(56) References Cited

U.S. PATENT DOCUMENTS

| | | | |
|---|---|---|---|
| 8,966,584 B2 * | 2/2015 | Hughes | H04L 63/08 709/225 |
| 9,832,082 B2 | 11/2017 | Dade et al. | |
| 10,756,983 B2 | 8/2020 | Ratkovic et al. | |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi | |
| 10,992,543 B1 | 4/2021 | Rachamadugu et al. | |
| 12,185,103 B2 * | 12/2024 | Raman | H04W 12/06 |
| 2021/0306201 A1 | 9/2021 | Wang et al. | |
| 2021/0383005 A1 * | 12/2021 | Varga | H04L 63/105 |

* cited by examiner

*Primary Examiner* — Joseph P Hirl
*Assistant Examiner* — Chi D Nguy
(74) *Attorney, Agent, or Firm* — Shumaker & Sieffert, P.A.

(57) ABSTRACT

A cloud-based architecture includes a cloud-based network management system (NMS) that provides the management plane and one or more cloud-based NAC systems that provide NAC services, including end-point device authentication. The cloud-based NAC system may have multiple groups of authentication server instances. Each group may have multiple authentication server instances to allow the authentication service provided by the group to serve more client devices than a single authentication server instance alone. Different Groups can be configured differently to serve different tenant sets.

20 Claims, 8 Drawing Sheets

HIGH AVAILABILITY MULTI-TENANT CLOUD BASED NETWORK ACCESS CONTROL SYSTEM

TECHNICAL FIELD

The disclosure relates generally to computer networks and, more specifically, to managing access to computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies.

Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible AP. In order to gain access to a wireless network, a wireless client device may first need to authenticate to the AP. Authentication may occur via a handshake exchange between the wireless client device, the AP, and an Authentication, Authorization, and Accounting (AAA) server controlling access at the AP.

SUMMARY

In general, this disclosure describes one or more techniques to solve multi-tenancy and scalability issues arising from a cloud-based network access control (NAC) system. Authentication servers (e.g., Remote Authentication Dial-In User Service (RADIUS) or FreeRADIUS servers) support multi-tenancy using virtual servers or instances but do not support clustering or other ways of managing which organizations or tenants use which authentication instances. It is desirable to limit the number of organizations that use a single authentication instance, but it may be too expensive and complex to assign a single authentication instance to each organization.

The proposed solution provides management of the authentication server instances to support scalable multi-tenancy in a cloud-based NAC system. The cloud-based architecture includes a cloud-based network management system (NMS) that provides the management plane and one or more cloud-based NAC systems that provide NAC services, including end-point device authentication. The cloud-based NAC system may have multiple groups of authentication server instances. A group may have multiple authentication server instances to allow the authentication service provided by the group to serve more client devices than a single authentication server instance alone which results in improved scalability. The authentication server instances of a group may be identically configured and serve a first set of tenants assigned to the group. Other groups of authentication server instances may be configured to serve other sets of tenants.

In one example, the disclosure is directed to a system comprising a cloud-based network management system (NMS) configured to manage a plurality of network access server (NAS) devices associated with one or more network tenants; and one or more cloud-based network access control (NAC) systems in communication with the NMS. The at least one NAC system is configured to: manage one or more groups of authentication server instances, wherein each group includes a plurality of authentication server instances, wherein a set of network tenants is assigned to each group, and wherein each instance within a group has a same set of configuration files for the set of network tenants assigned to the group; receive an authentication request via a secure tunnel from a NAS device of the plurality of NAS devices associated with a network tenant of the set of network tenants, the request including an indicator to identify the network tenant to which the NAS device belongs; determine, based on the indicator identifying the network tenant, the group to which the network tenant is assigned; select, based on a load balancing scheme, one authentication server instance of the plurality of authentication server instances within the group; and service the authentication request from the NAS device using the selected authentication server instance.

In another example, the disclosure is directed to a method comprising managing, at a cloud-based network access control (NAC) system in communication with a cloud-based network management system (NMS), one or more groups of authentication server instances, wherein each group includes a plurality of authentication server instances, wherein a set of network tenants is assigned to each group, and wherein each instance within a group has a same set of configuration files for the set of network tenants assigned to the group; receiving, at the NAC system, an authentication request via a secure tunnel from a NAS device of the plurality of NAS devices associated with a network tenant of the set of network tenants, the request including an indicator to identify the network tenant to which the NAS device belongs; determining, at the NAC system, based on the indicator identifying the network tenant, the group to which the network tenant is assigned; selecting, at the NAC system, based on a load balancing scheme, one authentication server instance of the plurality of authentication server instances within the group; and servicing, at the NAC system, the authentication request from the NAS device using the selected authentication server instance.

In an additional example, the disclosure is directed to a computer-readable storage medium comprising instructions that, when executed, cause one or more processors of a cloud-based network access control (NAC) system in communication with a cloud-based network management system (NMS) to manage one or more groups of authentication server instances, wherein each group includes a plurality of authentication server instances, wherein a set of network tenants is assigned to each group, and wherein each instance within a group has a same set of configuration files for the set of network tenants assigned to the group; receive an authentication request via a secure tunnel from a NAS device of the plurality of NAS devices associated with a network tenant of the set of network tenants, the request including an indicator to identify the network tenant to which the NAS device belongs; determine, based on the indicator identifying the network tenant, the group to which the network tenant is assigned; select, based on a load balancing scheme, one authentication server instance of the plurality of authentication server instances within the group; and service the authentication request from the NAS device using the selected authentication server instance.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
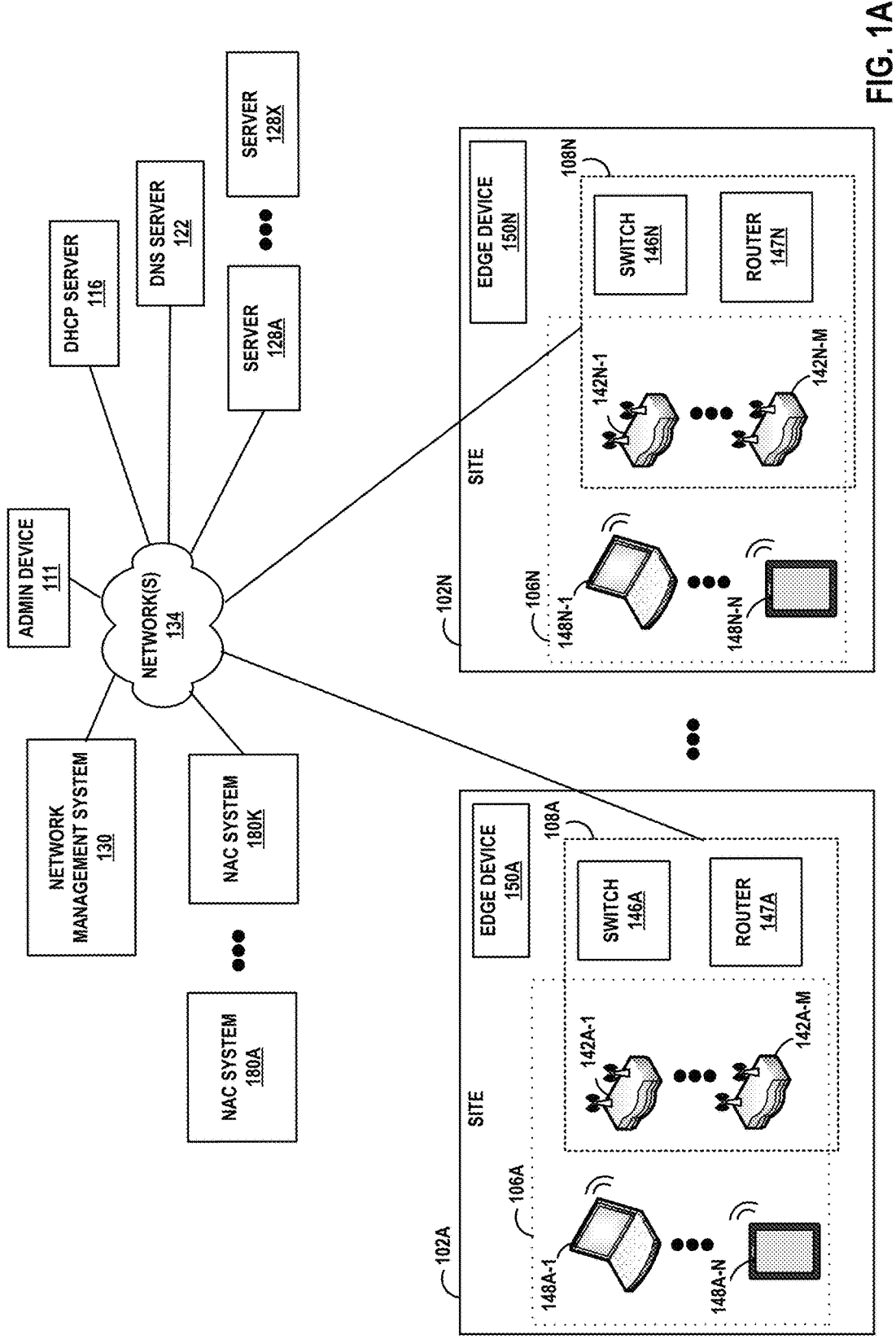
FIG. 1A is a block diagram of an example network system including a network management system and network access control systems, in accordance with one or more techniques of the disclosure.

FIG. 1A is a block diagram of an example network system 100 including network access control (NAC) systems 180A-180K and network management system (NMS) 130, in accordance with one or more techniques of this disclosure. Example network system 100 includes a plurality of sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices 108A-108N, such as access points (APs) 142, switches 146, and routers 147. NAS devices may include any network infrastructure devices capable of authenticating and authorizing client devices to access an enterprise network. For example, site 102A includes a plurality of APs 142A-1 through 142A-M, switch 146A, and router 147A. Similarly, site 102N includes a plurality of APs 142N-1 through 142N-M, switch 146N, and router 147N. Each AP 142 may be any type of wireless access point, including, but not limited to, a commercial or enterprise AP, a router, or any other device that is connected to a wired network and is capable of providing wireless network access to client devices within the site. In some examples, each of APs 142A-1 through 142A-M at site 102A may be connected to one or both of switch 146A and router 147A. Similarly, each of APs 142N-1 through 142N-M at site 102N may be connected to one or both of switch 146N and router 147N.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, gateways, or the like) via physical cables, e.g., Ethernet cables. Although illustrated in FIG. 1A as if each site 102 includes a single switch and a single router, in other examples, each site 102 may include more or fewer switches and/or routers. In addition, two or more switches at a site may be connected to each other and/or connected to two or more routers, e.g., via a mesh or partial mesh topology in a hub-and-spoke architecture. In some examples, interconnected switches 146 and routers 147 comprise wired local area networks (LANs) at sites 102 hosting wireless networks 106.

Example network system 100 also includes various networking components for providing networking services within the wired network including, as examples, NAC systems 180 including or providing access to authentication managers (such as Authentication, Authorization and Accounting (AAA) servers) for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and NMS 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of NAS devices 108, e.g., APs 142, switches 146, and routers 147, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices 108 while using NMS 130 and its distributed software architecture for scalable and resilient operations, management, troubleshooting, and analytics.

Each one of the network devices of network system 100, e.g., NAC systems 180, servers 116, 122 and/or 128, APs 142, switches 146, routers 147, UEs 148, edge devices 150, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 116, 122 and/or 128, APs 142, switches 146, routers 147, and UEs 148, may be considered "third-party" network devices when owned by and/or associated with a different entity than NMS 130 such that NMS 130 does not directly receive, collect, or otherwise have access to the recorded status and other data of the third-party network devices. In some examples, edge devices 150 may provide a proxy through which the recorded status and other data of the third-party network devices may be reported to NMS 130.

In the example of FIG. 1A, each of NAC systems 180 comprises a cloud-based network access control service at multiple, geographically distributed points of presence. Typically, network access control functionality is offered by on-premises appliances that are limited by processing power and memory as well as maintenance and upgrade issues. Offering cloud-based network access control services avoids the limitations and improves network administration. A centralized, cloud-based deployment of network access control, however, introduces issues with latency and failures that may block client devices from network access.

In accordance with the disclosed techniques, NAC systems 180 provide multiple points of presence or NAC clouds at several geographic regions. NMS 130 is configured to manage NAC configuration, including access policies for enterprise networks, and push the appropriate NAC configuration data or files to the respective NAC clouds 180A-180K. In this way, NAC systems 180 provide the same benefits as a centralized, cloud-based network access control service with lower latency and high availability.

NAC systems 180 provide a way of authenticating client devices 148 to access wireless networks 106, such as branch or campus enterprise networks. NAC systems 180 may each include or provide access to an authentication manager (such as Authentication, Authorization, and Accounting (AAA) server, e.g., a RADIUS server or FreeRADIUS server) to authenticate client devices 148 prior to providing access to the enterprise network via NAS devices 108. In some examples, NAC systems 180 may enable certificate-based authentication of client devices or enable interaction with cloud directory services to authenticate the client devices.

NAC systems 180 may identify client devices 148 and provide client devices 148 with the appropriate authorizations or access policies based on their identities, e.g., by assigning the client devices to certain virtual local area networks (VLANs), applying certain access control lists (ACLs), directing the client devices to certain registration portals, or the like. NAC systems 180 may identify client devices 148 by analyzing network behavior of the client devices, referred to as fingerprinting. Identification of client devices may be performed based on media access control (MAC) addresses, DHCP options used to request IP addresses, link layer discovery protocol (LLDP) packets, user agent information, and/or device type and operating system information.

Client devices 148 may include multiple different categories of devices with respect to a given enterprise, such as trusted enterprise devices, bring-your-own-device (BYOD) devices, IoT devices, and guest devices. NAC system 180 may be configured to subject each of the different categories of devices to different types of tracking, different types of authorization, and different levels of access privileges. In some examples, after a client device gains access to the enterprise network, NAC systems 180 may monitor activities of the client device to identify security concerns and, in response, re-assign the client device to a quarantine VLAN or another less privileged VLAN to restrict access of the client device.

NMS 130 is configured to operate according to an artificial intelligence/machine-learning-based computing platform providing comprehensive automation, insight, and assurance (WiFi Assurance, Wired Assurance and WAN assurance) spanning from "client," e.g., client devices 148 connected to wireless networks 106 and wired local area networks (LANs) at sites 102 to "cloud," e.g., cloud-based application services that may be hosted by computing resources within data centers.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100 so as to provide self-driving capabilities.

In some examples, AI-driven NMS 130 also provides configuration management, monitoring and automated oversight of software defined wide-area networks (SD-WANs), which operate as an intermediate network communicatively coupling wireless networks 106 and wired LANs at sites 102 to data centers and application services. In general, SD-WANs provide seamless, secure, traffic-engineered connectivity between "spoke" routers (e.g., routers 147) of the wired LANs hosting wireless networks 106, such as branch or campus enterprise networks, to "hub" routers further up the cloud stack toward the cloud-based application services. SD-WANs often operate and manage an overlay network on an underlying physical Wide-Area Network (WAN), which provides connectivity to geographically separate customer networks. In other words, SD-WANs extend Software-Defined Networking (SDN) capabilities to a WAN and allow network(s) to decouple underlying physical network infrastructure from virtualized network infrastructure and applications such that the networks may be configured and managed in a flexible and scalable manner.

In some examples, AI-driven NMS 130 may enable intent-based configuration and management of network system 100, including enabling construction, presentation, and execution of intent-driven workflows for configuring and managing devices associated with wireless networks 106, wired LAN networks, and/or SD-WANs. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

This disclosure describes one or more techniques to solve multi-tenancy and scalability issues arising from cloud-based NAC systems 180. Authentication servers (e.g., RADIUS or FreeRADIUS servers) support multi-tenancy using virtual servers or instances but do not support clustering or other ways of managing which organizations or tenants use which authentication instances. It is desirable to limit the number of organizations that use a single authentication instance, but it may be too expensive and complex to assign a single authentication instance to each organization. In accordance with the disclosed techniques, NMS 130 provides management of the authentication server instances at a given NAC system of NAC systems 180 (e.g., NAC system 180A) to support scalable multi-tenancy in the given NAC system 180A. The cloud-based architecture of network system 100 includes cloud-based NMS 130 that provides the management plane and cloud-based NAC systems 180 that provide NAC services, including end-point device authentication. Cloud-based NAC system 180A, for example, may have multiple groups of authentication server instances (not shown in FIG. 1A). A group may have multiple authentication server instances to allow the authentication service provided by the group to serve more client devices 148 or NAS devices 108 than a single authentication server instance alone which results in improved scalability. The authentication server instances of a group may be identically configured and serve a first set of tenants assigned to the group. Other groups of authentication server instances may be configured to serve other sets of tenants.

Although the techniques of the present disclosure are described in this example as performed by NAC systems 180 and/or NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NAC systems 180 or NMS 130, or may be distributed throughout network 100, and may or may not form a part of NAS systems 180 or NMS 130.

Figure 1B:
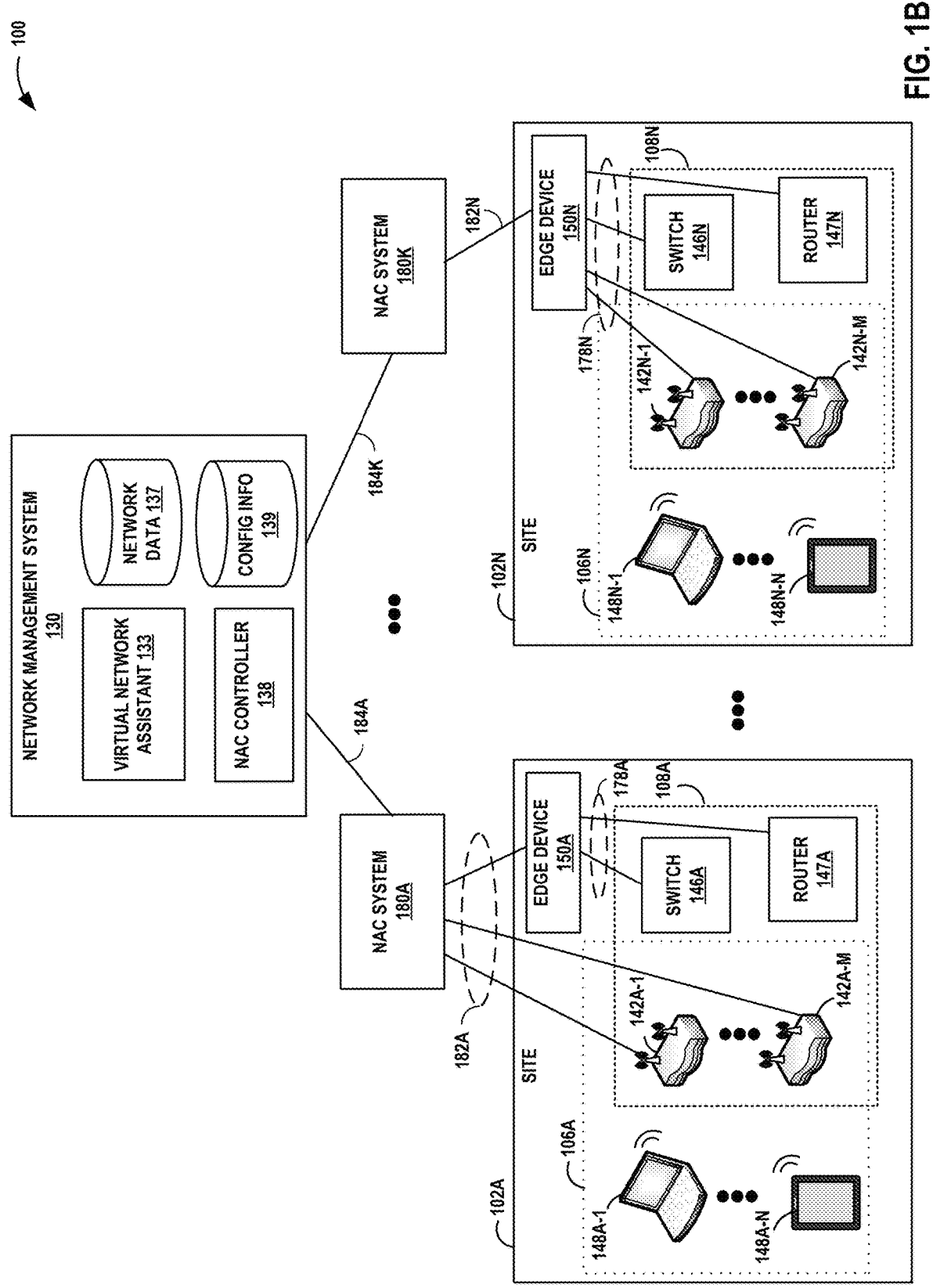
FIG. 1B is a block diagram illustrating further example details of the network system of FIG. 1A.

FIG. 1B is a block diagram illustrating further example details of the network system of FIG. 1A. In this example, FIG. 1B illustrates logical connections 178A-178N, 182A-182N, and 184A-184K, between NAS devices 108 at sites 102, NAC systems 180, and NMS 130. In addition, FIG. 1B illustrates NMS 130 configured to operate according to an AI-based computing platform to provide configuration and management of one or more of NAC systems 180 and NAS devices 108 at sites 102 via the logical connections.

In operation, NMS 130 observes, collects and/or receives network data 137, which may take the form of data extracted from messages, counters, and statistics, for example, from one or more of APs 142, switches 146, routers 147, edge devices 150, NAC systems 180, and/or other nodes within network 134. NMS 130 provides a management plane for network 100, including management of enterprise-specific configuration information 139 for one or more of NAS devices 108 at sites 102 and NAC systems 180. Each of the one or more NAS devices 108 and each of NAC systems 180 may have a secure connection with NMS 130, e.g., a RadSec (RADIUS over Transport Layer Security (TLS)) tunnel or another encrypted tunnel. Each of the NAS devices 108 and NAC systems 180 may download the appropriate enterprise-specific configuration information 139 from NMS 130 and enforce the configuration. In some scenarios, one or more of the NAS devices 108 may be a third-party device or otherwise not support establishment of a secure connection directly with NMS 130. In these scenarios, edge devices 150 may provide proxies through which the NAS devices 108 may connect to NMS 130.

In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In some examples, NMS 130 monitors network data 137, e.g., one or more service level expectation (SLE) metrics, received from each site 102A-102N, and manages network resources, such as the one or more of APs 142, switches 146, routers 147, and edge devices 150 at each site, to deliver a high-quality wireless experience to end users, IoT devices and clients at the site. In other examples, NMS 130 monitors network data 137 received from NAC systems 180 and manages enterprise-specific configuration information 139 for NAC systems 180 to enable unconstrained network access control services for client devices 148 at sites 102 with low latency and high availability.

As illustrated in FIG. 1B, NMS 130 may include a virtual network assistant (VNA) 133 that implements an event processing platform for providing real-time insights and simplified troubleshooting for IT operations, and that automatically takes corrective action or provides recommendations to proactively address network issues. VNA 133 may, for example, include an event processing platform configured to process hundreds or thousands of concurrent streams of network data 137 from sensors and/or agents associated with APs 142, switches 146, routers 147, edge devices 150, NAC systems 180, and/or other nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In addition, as illustrated in FIG. 1B, NMS 130 may include a NAC controller 138 that implements a NAC configuration platform that provides a user interface to create and assign access policies for client devices 148 of enterprise networks 106, and provides the appropriate enterprise-specific configuration information 139 to the respective NAC clouds 180A-180K. NMS 130 may have a secure connection 184A-184K, e.g., a RadSec tunnel or another encrypted tunnel, with each of NAC systems 180A-180K, respectively. Through secure connections 184, NAC controller 136 may receive network data 137, e.g., NAC event data, from each of NAC systems 180 and each of NAC systems 180 may download the appropriate configuration information 139 from NMS 130. In some examples, NAC controller 138 may log or map which enterprise networks are served by which of NAC systems 180. In addition, NAC controller 138 may monitor NAC systems 180 to identify failures of primary NAC systems and manage failovers to standby NAC systems.

NAC systems 180 provide network access control services in a control plane for one or more of NAS devices 108 at sites 102. In operation, NAC systems 180 authenticate client devices 148 to access enterprise wireless networks 106 and may perform fingerprinting to identify the client devices 148 and apply authorizations or access polices to the client devices 148 based on the identities. NAC systems 180 include multiple, geographically distributed points of presence. For example, NAC system 180A may comprise a first cloud-based system positioned within a first geographic region, e.g., U.S. East, NAC system 180B (not shown) may comprise a second cloud-based system positioned within a second geographic region, e.g., U.S. West, and NAC system 180K may comprise a $k^{th}$ cloud-based system positioned within a $k^{th}$ geographic region, e.g., China.

Deploying multiple NAC clouds at several geographic regions enables network access control services to be offered to nearby NAS devices with lower latency and high availability, while avoiding the processing limitations and maintenance issues experienced by on-premises NAC appliances. For example, NAS devices 108A within enterprise network site 102A may connect to the physically closest one of NAC systems, i.e., NAC system 180A, to experience lower latency for network access control services. In some examples, the physically closest one of NAC systems 180 may comprise a primary NAC system, and the NAS devices may also connect to a next closest one of NAC systems 180 as a standby NAC system in case of a failure of the primary NAC system. For example, NAS devices 108A within enterprise network site 102A may connect to both NAC system 180A and NAC system 108B (not shown), to experience high availability of network access control services.

In the example illustrated in FIG. 1B, each of the NAS devices 108, directly or indirectly, has a secure connection with at least one of NAC systems 180. For example, each of APs 142A within site 120A has a direct, secure connection 182A to NAC system 180A, e.g., a RadSec tunnel or another encrypted tunnel. Each of switch 146A and router 147A within site 120A has an indirect connection to NAC system 180A via edge device 150A. In this example, switch 146A and router 147A may not support establishment of a secure connection directly with NAC system 180A, but edge device 150A may provide a proxy through which switch 146A and router 147A may connect to NAC system 180A. For example, each of switch 146A and router 147A have a direct connection 178A, e.g., a RADIUS tunnel, to edge device 150A, and edge device 150A has a direct, secure connection 182A to NAC system 180A. Similarly, for site 102N, each of NAS devices 108N has an indirect connection to NAC system 180K via edge device 150N. In this example, APs 142N, switch 142N, and router 147N may not support establishment of a secure connection directly with NAC system 180K, but edge device 150N may provide a proxy through which NAS devices 108N may connect to NAC system 180K. For example, each of APs 142N, switch 146N, and router 147N have a direct connection 178N, e.g., a RADIUS tunnel, to edge device 150N, and edge device 150N has a direct, secure connection 182N to NAC system 180K.

Through secure connections 182, NAC systems 180 may receive network access requests from client devices 148 through NAS devices 108 (and in some cases edge devices 150) at nearby enterprise sites 102. In response to the network access requests, NAC systems 180 authenticate the requesting client devices using an authentication manager, such as a AAA server. NAC system 180 may perform fingerprinting to identify the authenticated client devices. NAC systems 180 then enforce the appropriate access policies on the identities of the authenticated client devices per the enterprise-specific configuration information 139 downloaded from NMS 130. In accordance with one specific implementation, a computing device is part of each of NAC systems 180. In accordance with other implementations, each of NAC systems 180A-180K may comprise one or more computing devices, dedicated servers, virtual machines, containers, services, or other forms of environments for performing the techniques described herein.

Figure 1C:
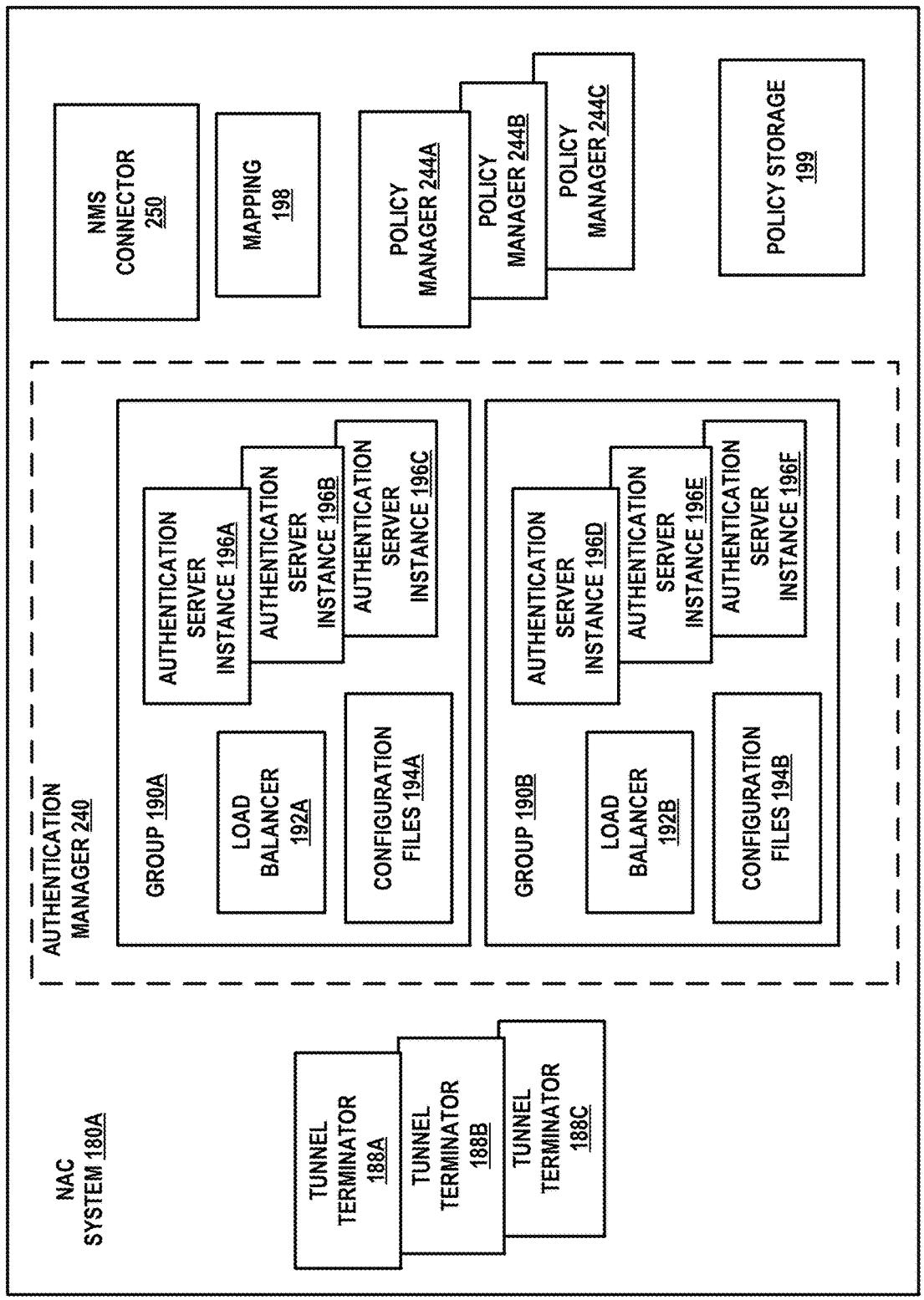
FIG. 1C is a conceptual diagram illustrating further example details of a network access control system of FIGS. 1A-1B.

FIG. 1C is a conceptual diagram illustrating further example details of a NAC system of FIGS. 1A and 1B. Although the illustrated example is described with respect to NAC system 180A, any of NAC systems 180B-180K from FIGS. 1A and 1B may be configured in a similar manner. In accordance with one or more techniques of this disclosure, to support scalable multi-tenancy, NAC system 180A may include a number of tunnel terminators 188A-188C (e.g., RadSec terminators), an authentication manager 240 including a number of groups 190A-190B that each include a number of authentication server instances 196A-196F, and a number of policy manager (policy daemon) instances 244A-244C, each of which may be configurable based on the number and type of organizations or tenants supported by the respective NAC system 180A.

The cloud-based NMS 130 of FIGS. 1A-B may be configured to manage a plurality of NAS devices 180 associated with one or more network tenants. The one or more cloud-based NAC systems 180 may be in communication with the NMS 130. NAC system 180A, as illustrated in FIG. 1C, includes NMS connector 250 configured to manage the data and information exchanged between NAC system 180A and NMS 130, e.g., via a RadSec tunnel or another encrypted tunnel 184, as shown in FIG. 1B. NMS connector 250 may maintain a log or mapping 198 of which organizations or network tenants are served by NAC system 180A and the corresponding configuration information for those tenants, e.g., configuration files 194. NMS connector 250 may also manage any updates or modifications to the configuration information received from NMS 130.

NAC system 180A shown in FIG. 1C may be configured to manage one or more groups 190 of authentication server instances 196. The authentication server instances 196 may be AAA server instances (e.g., RADIUS or FreeRADIUS server instances). Each group 190 may include a plurality of authentication server instances 196, a load balancer 192, and configuration files 194 associated with the one or more network tenants assigned to the respective group. For example, in FIG. 1C, group 190A includes authentication server instances 196A-196C and group 190B includes authentication server instances 196D-196F. Different sets of network tenants may be assigned to each group 190 and the associated configuration files 194 for each group includes the configuration information for the set of network tenants assigned to the respective group.

NMS connector 250 of NAC system 180A is configured to divide the authentication server instances 196 into groups, such as groups 190, and assign one or more organizations or tenants to each group based on load data monitored at NAC system 180A and/or NMS 130. For example, NMS connector 250 may perform instance scaling by generating group 190A having multiple authentication server instances 196A-196C in which each instance has the same set of configuration files 194A for a first set of tenants assigned to group 190A. Each instance within a group may have the same set of configuration files for the set of network tenants assigned to the group. For example, authentication server instances 196A-C of group 190A may use configuration files 194A and authentication server instances 196D-F of group 190B may use configuration files 194B.

Having multiple authentication server instances in each group increases the number of authentication requests that can be served for endpoint devices of the network tenants assigned to each group. For example, a large organization that needs to serve 10,000 authentication requests per second may use a first group 190A with five authentication server instances 196; each authentication server instance serving approximately 2,000 authentication requests per second. The NMS connector 250 may further perform instance sharding/grouping by generating multiple groups of authentication server instances with different sets of tenants assigned to each group. For example, three smaller organizations that, collectively, need to serve 7,500 authentication requests per second may use a second group 190B with three authentication server instances 196; each authentication server instance serving approximately 2,500 authentication requests per second.

An authentication request received by NAC system 180A via a secure tunnel from a NAS device of a network tenant includes an indicator to identify the network tenant to which the NAS device belongs. The secure tunnel may be a RADSEC (RADIUS over TLS) tunnel. A server name indication (SNI) may be included in the request to identify the organization or tenant of the NAS device. NAC system 180A determines based on the indicator, the group 190 to which the network tenant is assigned. In this way each authentication request can be sent to the group 190 configured to service NAS devices of that tenant. In one example, tunnel terminator 188A-188C discussed below may direct an incoming authentication request from a NAS device to the appropriate group 190 based on the network tenant to which the NAS device belongs.

A load balancer 192 within each group 190 may select, based on a load balancing scheme, one authentication server instance of the plurality of authentication server instances 196 within the group 190 to service the incoming authentication request. For example, load balancer 192A may distribute incoming requests for group 190 to the different authentication server instances 196A-C of group 190A so that each of the authentication server instance 196A-C has a similar workload. The selected authentication server instance may then service the authentication request for the NAS device.

As described above, NMS connector 250 may maintain a log or mapping 198 of which organizations or network tenants are served by NAC system 180A. NMS connector 250 may be configured to modify or update mapping 198 to map each network tenant of the set of network tenants to a particular group of the groups 190 of authentication server instances 196.

NMS connector 250 may update a configuration of each tunnel terminator 188A-188C with the mapping 198 such that each tunnel terminator knows how to direct an incoming authentication request from a NAS device to the appropriate group 190 based on the network tenant to which the NAS device belongs. NMS connector 250 may also update each authentication server instance 196 within the particular group 190 to include the configuration files 194 associated with each network tenant of the set of network tenants assigned to the particular group 190. For example, the NMS connector 250 may update the configuration files 194A of group 190A of authentication server instances 196A-C to include configuration information associated with the set of tenants assigned to group 190A.

The NMS connector 250 may, in response to receipt of an authentication request from a new organization, select a group from the one or more groups 190 of authentication server instances 196 to which to assign the new organization based at least on load levels at each of the one or more groups 190. For example, if group 190B has a lower workload than group 190A, the NMS connector 250 may select group 190B as the group to service authentication requests for the new organization.

The NMS connector 250 may periodically scale a number of groups 190 or a number of authentication server instances 196 within the group to accommodate changes in the load levels at the one or more groups 190. For example, the NAC system 180, either under the instructions of the NMS 130 through the NMS connector 250 or independently, may add or delete groups 190 of authentication server instances 196 as well as add or delete authentication server instances 196 in a group to deal with changing workload requirements of the assigned tenants.

A group such as group 190A may be associated with multiple tenants. For example, each of the authentication server instances 196A-196C of group 190A may service requests from first and second tenants. A specific authentication request from a NAS device of a first tenant may be serviced by authentication server instance 196B while another authentication request from a NAS device of a second tenant may be serviced by authentication server instance 196C. Each of authentication server instances 196 may be configured to service authentication requests from NAS devices of any of the first and second tenants based on configuration information for the first and second tenants stored in confirmation files 194A of group 190A.

The instances of the tunnel terminators 188A-188C, authentication server instances 196A-F, and policy manager 244A-C may be containerized in containers, such as Docker containers. Such containers may be managed by a container management system, such as Kubernetes. Such containerization may facilitate the generation of instances, such as authentication server instances 196, to deal with changes in demand as well as to deal with instance failures.

In one example, each group 190 may handle multiple organizations, and the tunnel terminators 188 may distribute incoming requests to the appropriate group. By terminating a tunnel at tunnel terminators 188, the system avoids the requirement of terminating a tunnel at an authentication server instance 196, which would limit the total number of authentication requests served for a tenant. Each group may be identified by a virtual address used by the tunnel terminators 188 to distribute the requests to the correct group.

Policy managers 244A-244C may provide policy information to the authentication server instances 196 of groups 190. Policy storage unit 199 may be configured to store configuration for the at least one of policy managers 244.

The authentication server instances 196 may use callbacks or plugins to code at policy managers 244. Policy managers 244 may run code that changes relatively frequently so that the authentication server instances 196 and configuration files 194 need not be frequently updated. The policy managers 244 may also be grouped similar to the authentication server instances 196 in the groups 190. For example, each of the groups 190 may have a particular policy manager instance for the assigned tenants. The callbacks or plugins into the policy managers 244 may also be load balanced using a policy manager load balancer (not shown). Policy managers 244 may avoid the issue of requiring a restart of the authentication server instances 196 whenever configuration files 194 would otherwise have to be changed. Instead, the code at policy managers 244 may be dynamically modified.

NMS connector 250 within the NAC system 180 may configure the number of groups 190 or the number of authentication server instances 196 within each group based on the traffic load for the set of organizations or tenants assigned to that group/shard. The number of groups/shards or instances may be adjusted as traffic needs change or organizations join or leave (i.e., intra-group scaling). In some examples, the adjustments may be managed by the NMS connector 250 in the NAC system 180 alone or based on updates pushed down to the NAC system 180A from NMS 130. NMS 130 may provide a user interface through which a site administrator for an organization may provide configuration rules 194 to be pushed down to the appropriate authentication server instances 196 in the NAC system 180A that are associated with the organization or tenant (e.g., via lazy download).

NMS connector 250 may maintain the mapping 198 of organizations or tenants to groups/shards for use by the tunnel terminators 188. Upon receipt of traffic from endpoint devices via secure tunnels (e.g., RadSec tunnels), tunnel terminators 188 terminate the secure tunnel in order to distribute the traffic from the secure tunnel to the appropriate group/shard 190 of authentication server instances 196 using a load balancing scheme. For example, tunnel terminator 188 within NAC system 180A terminates the secure tunnels and converts the request to a regular authentication request. The tunnel terminator may use a server name indication (SNI) included in the request to identify the organization or tenant of the endpoint device and may use mapping 198 to determine the group/shard 190 associated with the tenant to which to send the request. Load balancer 194 within each group/shard 190 may then select an authentication server instance 196 within the group/shard 190 to handle the request. The selected authentication server instance then services the request and may load balance to a policy manager instance 244 configured to apply the appropriate NAC policies for the organization or tenant.

The techniques of this disclosure provide one or more technical advantages and practical applications. For example, the techniques enable management of authentication server instances to support scalable multi-tenancy in a cloud-based NAC system. A group may have multiple authentication server instances to allow the authentication service provided by the group to serve more client devices or NAS devices than a single authentication server instance alone which results in improved scalability. Further scalability is provided by having multiple groups of the authentication server instances serving different sets of tenants.

Figure 2:
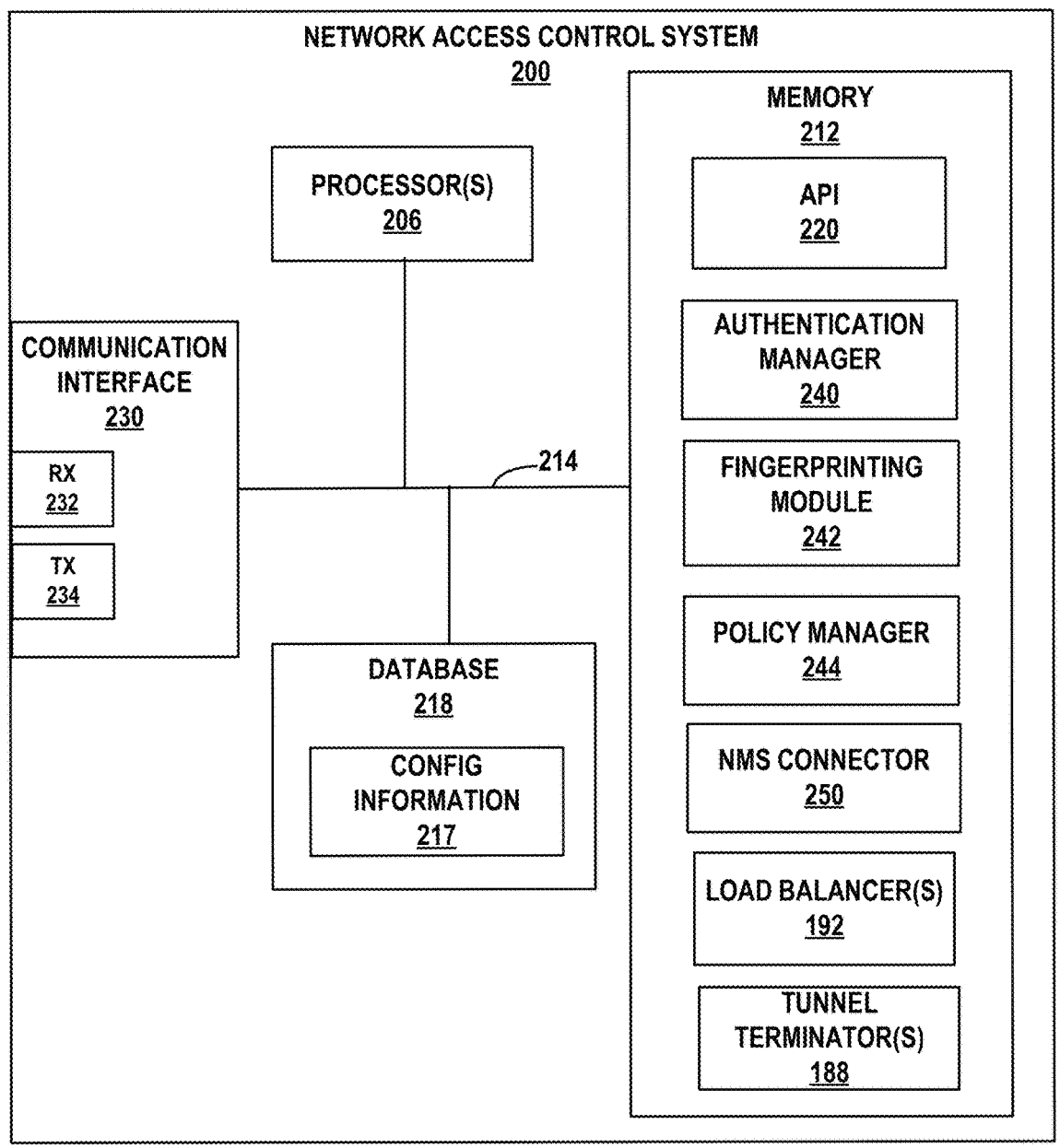
FIG. 2 is a block diagram of an example network access control system, in accordance with one or more techniques of this disclosure.

FIG. 2 is a block diagram of an example network access control (NAC) system 200, in accordance with one or more techniques of the disclosure. NAC system 200 may be used to implement, for example, any of NAC systems 180 in FIGS. 1A, 1B. In such examples, NAC system 200 is responsible for authenticating and authorizing one or more client devices 148 to access enterprise wireless networks 106 at a sub-set of nearby enterprise sites 102A-102N.

NAC system 200 includes a communications interface 230, one or more processor(s) 206, a user interface 210, a memory 212, and a database 218. The various elements are coupled together via a bus 214 over which the various elements may exchange data and information. In some examples, NAC system 200 receives network access requests from one or more of client devices 148 through NAS devices 108 (and in some cases edge devices 150) at the sub-set of nearby enterprise sites 102 from FIGS. 1A, 1B. In response to the network access requests, NAC system 200 authenticates the requesting client devices. In some examples, NAC system 200 enforces appropriate access policies on the authenticated client devices in accordance with enterprise-specific configuration information 217 downloaded from NMS 130 from FIGS. 1A, 1B. In some examples, NAC system 200 may be part of another server shown in FIGS. 1A, 1B or a part of any other server.

Processor(s) 206 execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 230 may include, for example, an Ethernet interface. Communications interface 230 couples NAC system 200 to a network and/or the Internet, such as any of network 134 as shown in FIG. 1A and/or any local area networks. Communications interface 230 includes receiver 232 and transmitter 234 by which NAC system 200 receives/transmits data and information to/from any of APs 142, switches 146, routers 147, edge devices 150, NMS 130, or servers 116, 122, 128 and/or any other network nodes, devices, or systems forming part of network system 100 such as shown in FIGS. 1A, 1B.

The data and information received by NAC system 200 may include, for example, configuration information 217 associated with one or more of enterprise sites 102 that is downloaded from NMS 130. Configuration information 217 may include enterprise-specific NAC configuration information, including access policies and associated policy assignment criteria. For example, configuration information 217 may define certain virtual local area networks (VLANs), access control lists (ACLs), registration portals, or the like, associated with certain categories of client devices. Configuration information 217 may further define, for each of the different categories of the client devices, different types of tracking, different types of authorization, and/or different levels of access privileges. In addition, the data and information received by NAC system 200 may include identification information of client devices 148 from NAS devices 108 that is used by NAC system 200 to perform fingerprinting of the end user devices in order to enforce the access policies as defined in configuration information 217. NAC system 200 may further transmit data and information via communications interface 330 to NMS 130 including, for example, NAC event data, which may be used by NMS 130 to remotely monitor the performance of NAC system 200.

Memory 212 includes one or more devices configured to store programming modules and/or data associated with operation of NAC system 200. For example, memory 212 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 includes API 220, authentication manager 240, fingerprinting module 242, policy manager 244, and NMS connector 250. NAC system 200 may also include any other programmed modules, software engines and/or interfaces configured for authentication and authorization of client devices 148.

Authentication manager 240 enables authentication of client devices 148 at NAS devices 108 to access wireless networks 106, such as branch or campus enterprise networks, at the sub-set of enterprise sites 102 in communication with NAC system 200. Authentication manager 240 may perform the functionality of an AAA server, e.g., a RADIUS server, or provide access to an AAA server to authenticate client devices 148 prior to providing access to enterprise networks 106 via NAS devices 108. In some examples, authentication manager 240 may participate in a handshake exchange between a client device, an NAS device, and NAC system 200 controlling access at the NAS device. In other examples, authentication manager 240 may enable certificate-based authentication of client devices or enable interaction with cloud directory services to authenticate the client devices.

Fingerprinting module 242 enables identification of client devices 148 used to provide the client devices with appropriate authorizations or access policies based on their identities or categorizations. Fingerprinting module 242 may identify client devices 148 by analyzing network behavior of the client devices. Fingerprinting module 242 may receive the network behavior data of the client devices from NAS devices 108 and/or edge devices 150 in communication with NAS system 200. For example, fingerprinting module 242 may perform fingerprinting of client devices 148 based on one or more of MAC addresses, DHCP options used to request IP addresses, LLDP packets, user agent information, and/or device type and operating system information.

Policy manager 244 enables enforcement of the authorizations or access policies based on the identities or categorizations of the authenticated client devices. For example, policy manager 244 may assign the authenticated client devices to certain VLANs, apply certain ACLs, direct the client devices to certain registration portals, or the like, that are each associated with different types of tracking, different types of authorization, and/or different levels of access privileges in accordance with configuration information 217 for the corresponding enterprise of the client devices. In some examples, after a client device gains access to the enterprise network, policy manger 244 may monitor activities of the client device to identify security concerns and, in response, re-assign the client device to a quarantine VLAN or another less privileged VLAN to restrict access of the client device.

NMS connector 250 manages the data and information exchanged between NAC system 200 and NMS 130, e.g., via a RadSec tunnel or another encrypted tunnel 184, as shown in FIG. 1B. NMS connector 250 may maintain a log or mapping of which enterprise networks are served by NAC system 200 and the corresponding configuration information 217 for those enterprises. NMS connector 250 may also manage any updates or modifications to configuration information 217 received from NMS 130.

In accordance with one or more techniques of this disclosure, NMS connector 250 may receive groupings or data to determine the groupings from the NMS 130. For example, the NMS connector 250 may maintain a mapping of organizations or tenants to groups/shards for use by the tunnel terminators 188.

In accordance with one or more techniques of this disclosure, authentication manager 240 is configurable to include multiple groups 190 of authentication server instances 196, as illustrated in FIG. 1C. Each group 190 may have its own configuration files 194 so that each authentication server instance 196 of the group 190 may service authentication requests from the same set of tenants.

In accordance with one or more techniques of this disclosure, load balancers 192 may select, based on a load balancing scheme, one authentication server instance of the plurality of authentication server instances within the group to service incoming authentication requests. For example, load balancers 192 may distribute incoming requests for groups to different authentication server instances so that each of the authentication server instance has a similar workload.

In accordance with one or more techniques of this disclosure, tunnel terminators 188 terminate the secure tunnels and converts requests to a regular authentication request. The tunnel terminator may use a SNI included in the request to identify the organization or tenant of the endpoint device and may use a mapping to determine the group/shard associated with the tenant to which to send the request.

Figure 3:
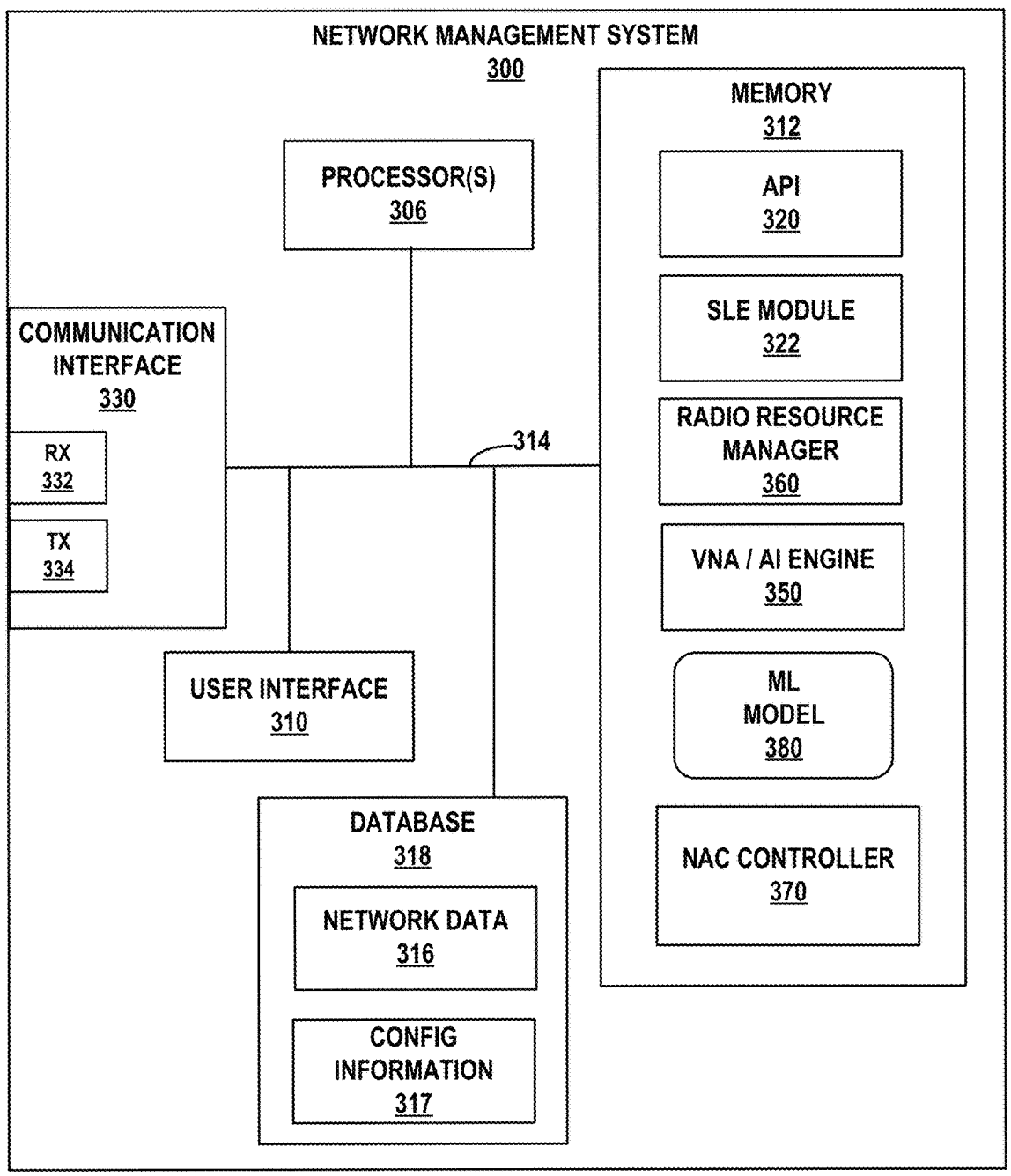
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. TA, 1B. In such examples, NMS 300 is responsible for monitoring and management of one or more wireless networks 106A-106N at sites 102A-102N, respectively.

NMS 300 includes a communications interface 330, one or more processor(s) 306, user interface 310, memory 312, and database 318. The various elements are coupled together via a bus 314 over which the various elements may exchange data and information. In some examples, NMS 300 receives data from one or more of client devices 148, APs 142, switches 146, routers, 147, edge devices 150, NAC systems 180, and other network nodes within network 134, e.g., routers and gateway devices, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, routers 147, edge devices 150, NAC systems 180, servers 116, 122, 128 and/or any other network nodes, devices, or systems forming part of network system 100 such as shown in FIG. 1A. In some scenarios described herein in which network system 100 includes "third-party" network devices that are owned and/or associated with different entities than NMS 300, NMS 300 does not directly receive, collect, or otherwise have access to network data from the third-party network devices. In some examples, an edge device, such as edge devices 150 from FIGS. 1A, 1B, may provide a proxy through which the network data of the third-party network devices may be reported to NMS 300.

The data and information received by NMS 300 may include, for example, telemetry data, SLE-related data, or event data received from one or more of client device APs 148, APs 142, switches 146, routers 147, edge devices 150, NAC systems 180, or other network nodes, e.g., routers and gateway devices, used by NMS 300 to remotely monitor the performance of wireless networks 106A-106N and application sessions from client device to cloud-based application server. NMS 300 may further transmit data via communications interface 330 to any of the network devices, such as client devices 148, APs 142, switches 146, routers 147, edge devices 150, NAC systems 180, or other network nodes within network 134, to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes API 320, SLE module 322, virtual network assistant (VNA)/AI engine 350, radio resource management (RRM) engine 360, and NAC controller 370. NMS 300 may also include any other programmed modules, software engines and/or interfaces configured for remote monitoring and management of wireless networks 106A-106N and portions of the wired network, including remote monitoring and management of any of APs 142, switches 146, routers 147, edge devices 150, NAC systems 180, or other network devices, e.g., routers and gateway devices.

SLE module 322 enables set up and tracking of thresholds for SLE metrics for each network 106A-106N. SLE module 322 further analyzes SLE-related data collected by, e.g., APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to adjust the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. In some examples, ML model 380 may comprise a supervised ML model that is trained, using training data comprising pre-collected, labeled network data received from the network devices. The supervised ML model may comprise one of a logistical regression, naïve Bayesian, support vector machine (SVM), or the like. In other examples, ML model 380 may comprise an unsupervised ML model. Although not shown in FIG. 3, in some examples, database 318 may store the training data and VNA/AI engine 350 or a dedicated training module may be configured to train ML model 380 based on the training data to determine appropriate weights across the one or more features of the training data.

Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

NAC controller 370 implements a NAC configuration platform that provides user interface 310 for display to an enterprise network administrator, e.g., via admin device 111 of FIG. 1A, through which to receive access policy information for the enterprise network. NAC controller 370 creates enterprise-specific configuration information 317 stored in database 318 based on the input received via user interface 310. Configuration information 317 may include NAC configuration information for one or more enterprise networks managed by NMS 300. For each enterprise, configuration information 317 may including access policies and associated policy assignment criteria. For example, configuration information 317 may define certain VLANs, ACLs, registration portals, or the like, associated with certain categories of client devices, and may further define, for each of the different categories of the client devices, different types of tracking, different types of authorization, and/or different levels of access privileges. Configuration information 317 may be substantially similar to configuration information 139 of FIG. 1B.

NAC controller 370 manages the data and information exchanged between NMS 300 and NAC systems 180, e.g., via a RadSec tunnels or another encrypted tunnels 184, as shown in FIG. 1B. NAC controller 370 may maintain a log or mapping of which enterprise networks are served by which of NAC systems 180 and the corresponding configuration information 317 for those enterprises. NAC controller 370 may also manage any updates or modifications to configuration information 317 to be pushed down to NAC systems 180. In addition, NAC controller 370 may monitor NAC systems 180 to identify failures of primary NAC systems and manage failovers to standby NAC systems.

In accordance with one or more techniques of this disclosure, the NMS 300 may control the number of groups 190, the number of application server instances 196 in each group and the set of tenants associated with each group, as well as the configuration for the application server instances 196 within each of NAC systems 180, as illustrated in FIG. 1C. Such control may be done through instructions sent from the NAC controller 370 to the NMS connector 250 of NAC system 180, 200. NMS 300 may analyze network data 316 to determine how to control the number of groups 190, the number of application server instances 196 in each group and the set of tenants associated with each group, as well as the configuration for the application server instances 196 within each of NAC systems 180.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
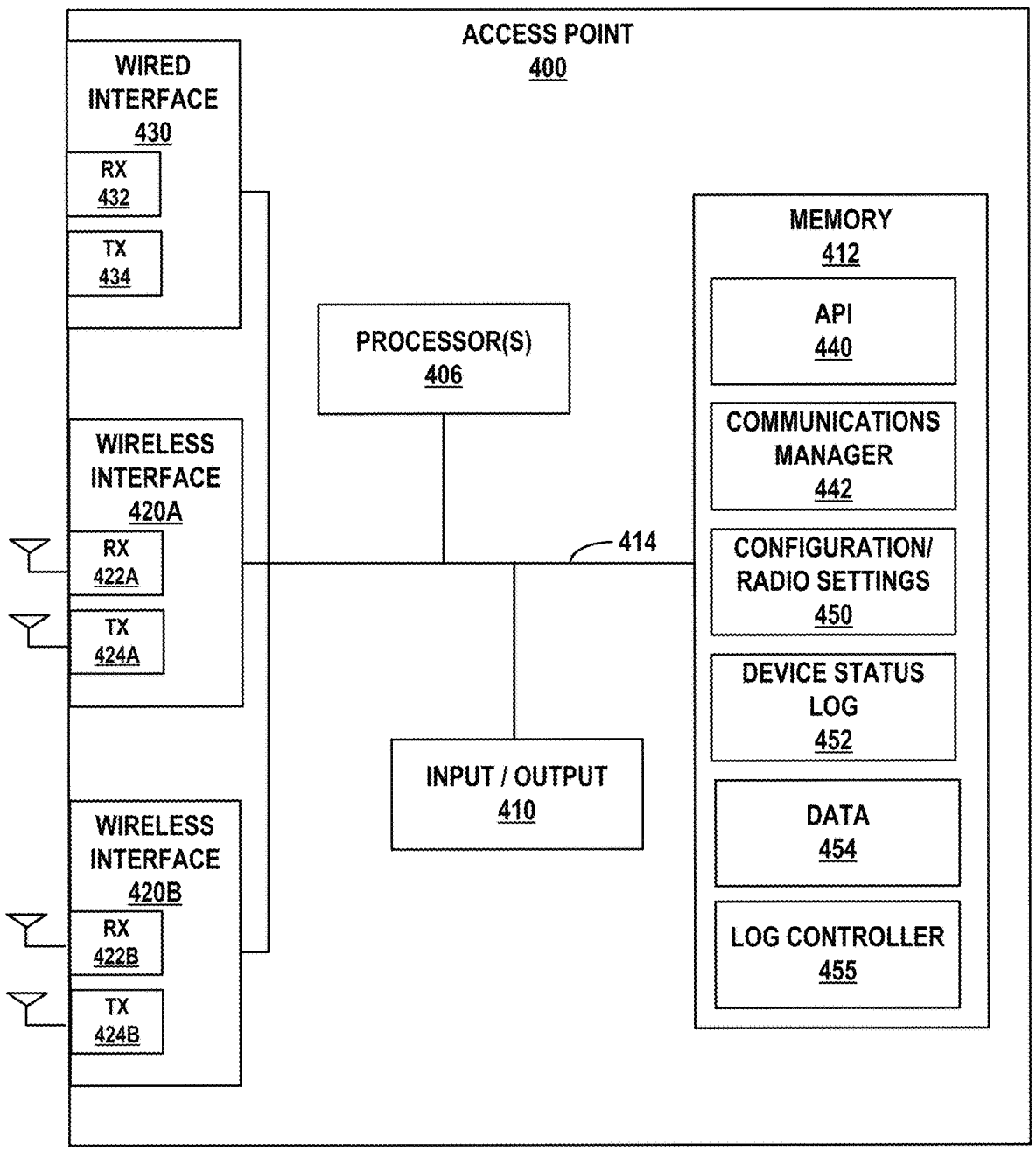
FIG. 4 is a block diagram of an example access point device, in accordance with one or more techniques of this disclosure.

FIG. 4 is a block diagram of an example access point (AP) device 400, in accordance with one or more techniques of this disclosure. Example access point 400 shown in FIG. 4 may be used to implement any of APs 142 as shown and described herein with respect to FIG. 1A. Access point 400 may comprise, for example, a Wi-Fi, Bluetooth and/or Bluetooth Low Energy (BLE) base station or any other type of wireless access point.

In the example of FIG. 4, access point 400 includes a wired interface 430, wireless interfaces 420A-420B one or more processor(s) 406, memory 412, and input/output 410, coupled together via a bus 414 over which the various elements may exchange data and information. Wired interface 430 represents a physical network interface and includes a receiver 432 and a transmitter 434 for sending and receiving network communications, e.g., packets. Wired interface 430 couples, either directly or indirectly, access point 400 to a wired network device, such as one of switches 146 or routers 147 of FIGS. 1A, 1B, within the wired network via a cable, such as an Ethernet cable.

First and second wireless interfaces 420A and 420B represent wireless network interfaces and include receivers 422A and 422B, respectively, each including a receive antenna via which access point 400 may receive wireless signals from wireless communications devices, such as UEs 148 of FIGS. 1A, 1B. First and second wireless interfaces 420A and 420B further include transmitters 424A and 424B, respectively, each including transmit antennas via which access point 400 may transmit wireless signals to wireless communications devices, such as UEs 148 of FIGS. 1A, 1B. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy (BLE) interface. As described above, AP 400 may request network access for one or more UEs 148 from a nearby NAC system, e.g., NAC system 200 of FIG. 2 or one of NAC systems 180 of FIGS. 1A, 1B.

Processor(s) 406 are programmable hardware-based processors configured to execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause one or more processors 406 to perform the techniques described herein.

Memory 412 includes one or more devices configured to store programming modules and/or data associated with operation of access point 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause one or more processor(s) 406 to perform the techniques described herein.

In this example, memory 412 stores executable software including application programming interface (API) 440, communications manager 442, configuration settings 450, a device status log 452, data storage 454, and log controller 455. Device status log 452 includes a list of events specific to access point 400. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 455 determines a logging level for the device based on instructions from NMS 130. Data 454 may store any data used and/or generated by access point 400, including data collected from UEs 148, such as data used to calculate one or more SLE metrics, that is transmitted by access point 400 for cloud-based management of wireless networks 106A by NMS 130/300.

Input/output (I/O) 410 represents physical hardware components that enable interaction with a user, such as buttons, a display, and the like. Although not shown, memory 412 typically stores executable software for controlling a user interface with respect to input received via I/O 410. Communications manager 442 includes program code that, when executed by processor(s) 406, allow access point 400 to communicate with UEs 148 and/or network(s) 134 via any of interface(s) 430 and/or 420A-420C. Configuration settings 450 include any device settings for access point 400 such as radio settings for each of wireless interface(s) 420A-420C. These settings may be configured manually or may be remotely monitored and managed by NMS 130 to optimize wireless network performance on a periodic (e.g., hourly or daily) basis.

As described herein, AP device 400 may measure and report network data from status log 452 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130/300 may determine one or more SLE metrics based on the SLE-related data received from the APs in the wireless network and store the SLE metrics as network data 137 (FIG. 1B).

Figure 5:
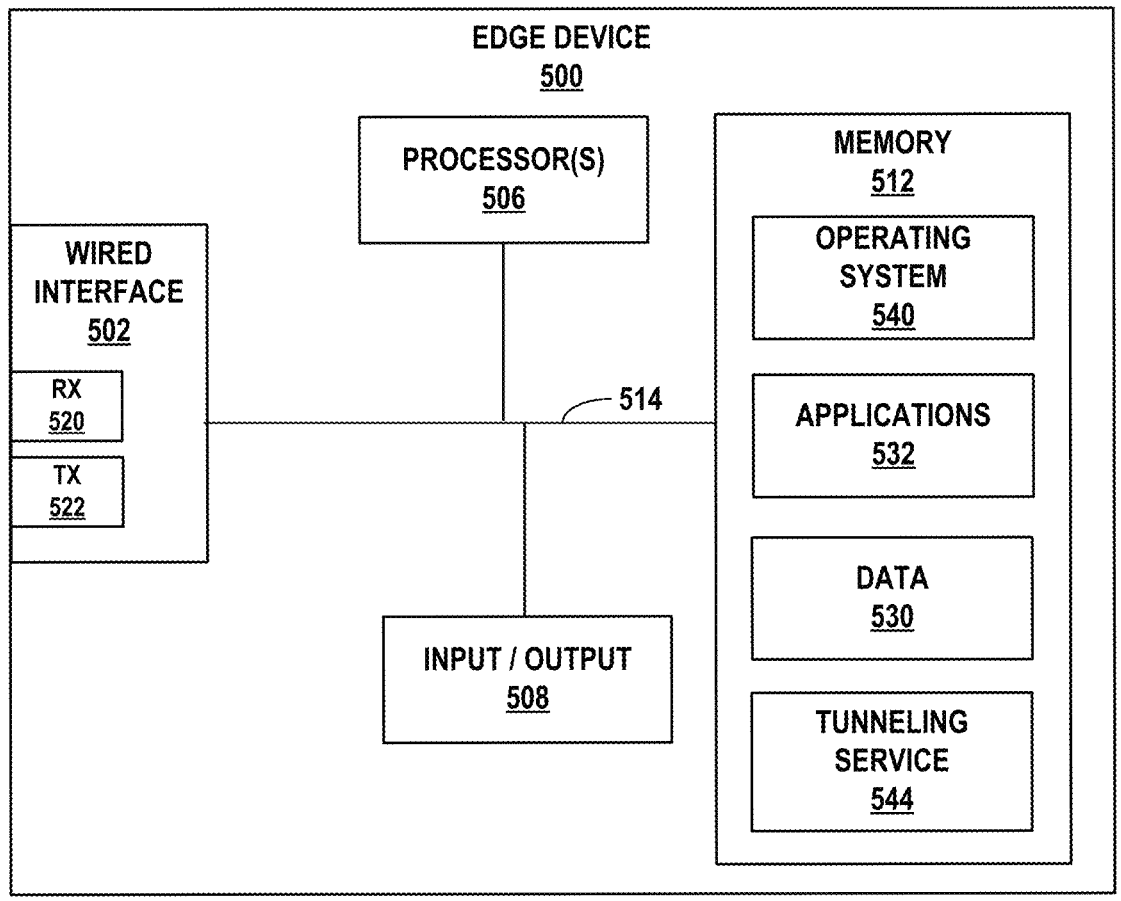
FIG. 5 is a block diagram of an example edge device, in accordance with one or more techniques of this disclosure.

FIG. 5 is a block diagram illustrating an example edge device 500, in accordance with one or more techniques of this disclosure. Edge device 500 comprises a cloud-managed, wireless local area network (LAN) controller. Edge device 500 may be used to implement, for example, any of edge devices 150 in FIGS. 1A, 1B. In such examples, edge device 500 comprises an on-premises device at site 102 that is in communication with NMS 130 and one or more on-premises NAS devices 108, e.g., one or more APs 142, switches 146, or routers 147, from FIGS. 1A, 1B. Edge device 500 with NMS 130 and may operate to extend certain microservices from NMS 130 to the on-premises NAS devices 108 while using NMS 130 and its distributed software architecture for scalable and resilient operations, management, troubleshooting, and analytics.

In this example, edge device 500 includes wired interface 502, e.g., Ethernet interface, processor 506, input/output 508, e.g., display, buttons, keyboard, keypad, touch screen, mouse, etc., and memory 512 coupled together via bus 514 over which the various elements may interchange data and information. Wired interface 502 couples edge device 500 to a network, such as network 134 shown in FIG. 1A and/or any local area networks. Wired interface 502 includes receiver 520 and transmitter 522 by which edge device 500 receives/transmits data and information to/from any of NAS devices 108 and NMS 130 and/or NAC systems 180. Though only one interface is shown by way of example, edge device 500 may have multiple communication interfaces and/or multiple communication interface ports.

Memory 512 stores executable software applications 532, operating system 540 and data/information 530. Data 530 may include a system log and/or an error log that stores event data, including behavior data, for edge device 500. Tunneling service 544 provides on-premises tunnel termination from APs and other NAS devices. Tunneling service 544 further provides a secure tunnel proxy to NMS 130 and/or NAC systems 180. In one scenario, one or more of the NAS devices 108, e.g., switch 146A from FIG. 1B, may not support establishment of RadSec tunnels directly with NMS 130 and/or NAC systems 180. In this scenario, tunneling service 544 of edge device 500 provides a RadSec proxy to enable RADIUS packets received from switch 146A via RADIUS tunnel 178A to be tunneled to NAC system 180A using RadSec tunnel 182A, as shown in FIG. 1B.

Figure 6:
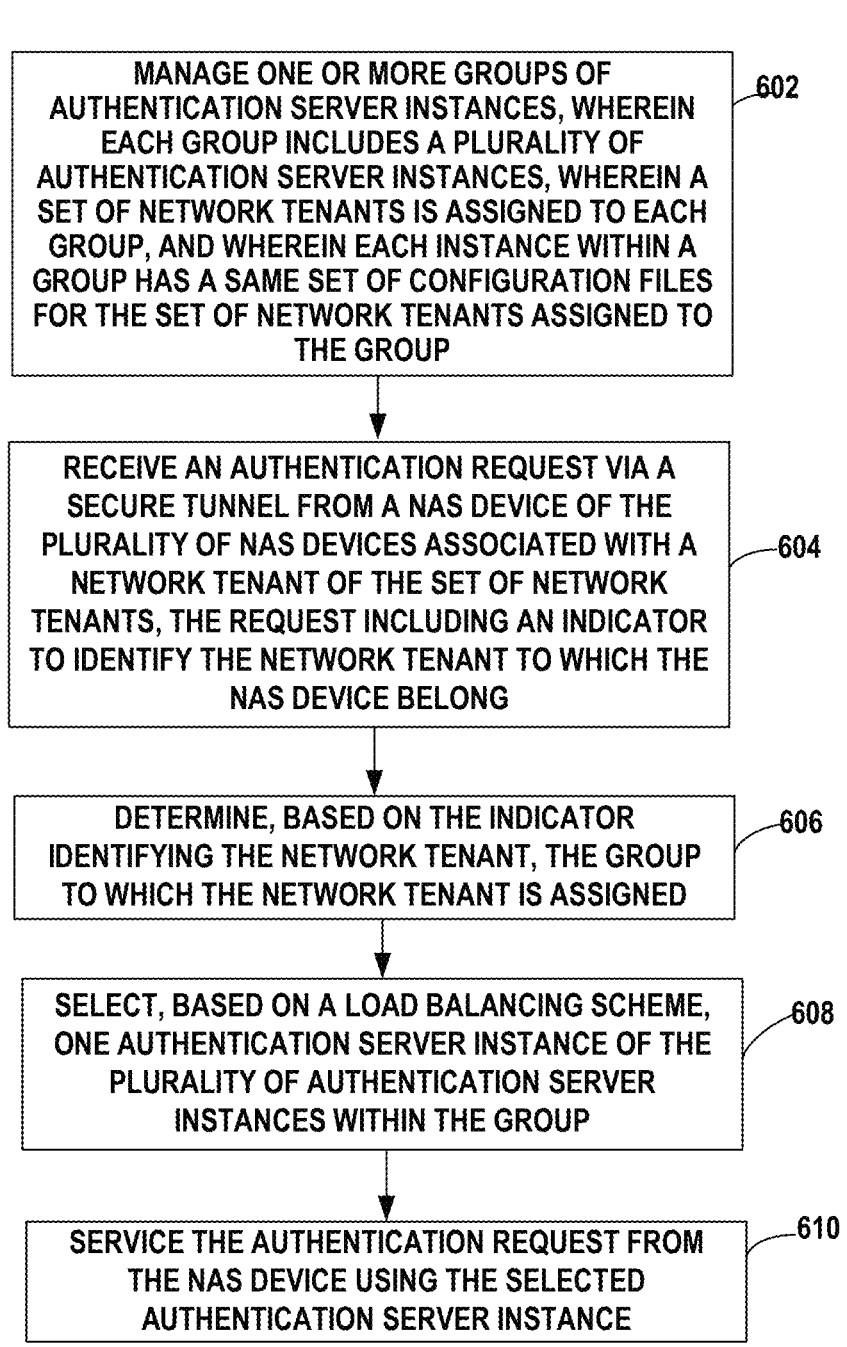
FIG. 6 is a flow chart illustrating an example operation for a high availability multi-tenant cloud based network access control system in accordance with one or more techniques of this disclosure.

FIG. 6 is a flow chart illustrating an example operation for a high availability multi-tenant cloud based network access control system 180 in accordance with one or more techniques of this disclosure. The example operation of FIG. 6 is described herein with respect to NMS 130 and NAC systems 180 of FIGS. 1A-C. In other examples, the operation of FIG. 6 may be performed by NAC system 200 of FIG. 2, NMS 130 of FIG. 3, and/or other computing systems or devices.

NAC system 180A manages one or more groups 190 of authentication server instances 196, wherein each group includes a plurality of authentication server instances, wherein a set of network tenants is assigned to each group, and wherein each instance within a group has a same set of configuration files 194 for the set of network tenants assigned to the group (602). The NAC system 180 may receive an authentication request via a secure tunnel from a NAS device of the plurality of NAS devices associated with a network tenant of the set of network tenants, the request may include an indicator to identify the network tenant to which the NAS device belongs (604)

NAC system 180 may determine, based on the indicator identifying the network tenant, the group to which the network tenant is assigned (606). The indicator may be a server name indication (SNI) included in the request which identifies the organization of NAS device sending the authentication request. NAC system 180 may select, based on a load balancing scheme, one authentication server instance of the plurality of authentication server instances 196 within the group (608). NAC system 180 may service the authentication request from the NAS device using the selected authentication server instance. (610)

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
 a cloud-based network management system (NMS) configured to manage a plurality of network access server (NAS) devices associated with a plurality of network tenants; and
 one or more cloud-based network access control (NAC) systems in communication with the NMS, wherein at least one NAC system is configured to:
  manage one or more groups of authentication server instances, wherein each group includes a plurality of authentication server instances and is assigned a set of network tenants of the plurality of network tenants, and wherein each authentication server instance within a group has a same set of configuration files for the set of network tenants assigned to the group;
  receive, by a tunnel terminator of one or more tunnel terminators at the at least one NAC system, an authentication request via a secure tunnel from a NAS device of the plurality of NAS devices associated with a network tenant of the plurality of network tenants, the request including an indicator to identify the network tenant to which the NAS device belongs;
  determine, by the tunnel terminator and based on the indicator identifying the network tenant, the group of authentication server instances to which the network tenant is assigned;
  send, by the tunnel terminator, the authentication request to the group of authentication server instances to which the network tenant is assigned;
  select, by a load balancer for the authentication request and based on a load balancing scheme for load balancing authentication requests among the plurality of authentication server instances within the group, an authentication server instance of the plurality of authentication server instances within the group; and
  service the authentication request from the NAS device using the selected authentication server instance.

2. The system of claim 1, wherein, to manage the one or more groups of authentication server instances, the at least one NAC system is configured to:
 generate a mapping of each network tenant of the plurality of network tenants to a particular group of the one or more groups of authentication server instances;
 update a configuration of each tunnel terminator of the one or more tunnel terminators with the mapping; and
 update each authentication server instance within the particular group to include configuration files for each network tenant of the set of network tenants assigned to the particular group.

3. The system of claim 1, wherein, to manage the one or more groups of authentication server instances, the at least one NAC system is configured to:
 in response to receipt of an authentication request from a NAS device associated with a new tenant, select a group from the one or more groups of authentication server instances to which to assign the new tenant based at least on load levels at each of the one or more groups; and
 periodically scale a number of groups or a number of authentication server instances within the group to accommodate changes in the load levels at the one or more groups.

4. The system of claim 1, wherein the network tenant comprises a first network tenant in the set of network tenants assigned to the group, wherein the set of network tenants assigned to the group includes the first network tenant and a second network tenant of the plurality of network tenants, and wherein the at least one NAC system is configured to service a second authentication request from a NAS device associated with the second network tenant using a second selected authentication server instance of the plurality of authentication server instances within the group.

5. The system of claim 1, wherein each of the plurality of authentication server instances of the group is contained within a container.

6. The system of claim 1, wherein the at least one NAC system includes at least one policy manager and wherein the at least one policy manager provides policy information to the plurality of authentication server instances of the group.

7. The system of claim 6, wherein the at least one NAC system includes at least one policy storage unit configured to store configuration files for the plurality of network tenants for the at least one policy manager.

8. The system of claim 1, wherein to service the authentication request from the NAS device using the selected authentication server instance, the NAC system is configured to provide RADIUS (Remote Authentication Dial-In User Service) service using the selected authentication server instance of the group to the NAS device, and wherein the secure tunnel is a RADSEC (RADIUS over TLS) tunnel.

9. A method comprising:
managing, at a cloud-based network access control (NAC) system in communication with a cloud-based network management system (NMS), one or more groups of authentication server instances, wherein each group includes a plurality of authentication server instances and is assigned a set of network tenants, and wherein each authentication server instance within a group has a same set of configuration files for the set of network tenants assigned to the group;
receiving, by a tunnel terminator of one or more tunnel terminators at the NAC system, an authentication request via a secure tunnel from a network access server (NAS) device associated with a network tenant of a plurality of network tenants, the request including an indicator to identify the network tenant to which the NAS device belongs;
determining, by the tunnel terminator at the NAC system, based on the indicator identifying the network tenant, the group of authentication server instances to which the network tenant is assigned;
sending, by the tunnel terminator at the NAC system, the authentication request to the group of authentication server instances to which the network tenant is assigned;
selecting, by a load balancer for the group of authentication instances at the NAC system, for the authentication request and based on a load balancing scheme for load balancing authentication requests among the plurality of authentication server instances within the group, an authentication server instance of the plurality of authentication server instances within the group; and
servicing, at the NAC system, the authentication request from the NAS device using the selected authentication server instance.

10. The method of claim 9, further comprising:
generating, at the NAC system, a mapping of each network tenant of the plurality of network tenants to a particular group of the one or more groups of authentication server instances;
updating, at the NAC system, a configuration of each tunnel terminator of the one or more tunnel terminators at the NAC system with the mapping; and
updating, at the NAC system, each authentication server instance within the particular group to include configuration files for each network tenant of the set of network tenants assigned to the particular group.

11. The method of claim 9, further comprising:
in response to receipt of an authentication request from a NAS device associated with a new tenant, selecting, at the NAC system, a group from the one or more groups of authentication server instances to which to assign the new tenant based at least on load levels at each of the one or more groups; and
periodically scaling, at the NAC system, a number of groups or a number of authentication server instances within the group to accommodate changes in the load levels at the one or more groups.

12. The method of claim 9, wherein the network tenant comprises a first network tenant in the set of network tenants assigned to the group, wherein the set of network tenants assigned to the group includes the first network tenant and a second network tenant, further comprising servicing, at the NAC system, a second authentication request from a NAS device associated with the second network tenant using a second selected authentication server instance of the plurality of authentication server instances within the group.

13. The method of claim 9, wherein each of the plurality of authentication server instances of the group is contained within a container.

14. The method of claim 9, further comprising providing policy information to the plurality of authentication server instances of the group from at least one policy manager at the NAC system.

15. The method of claim 14, further comprising storing configuration files for the plurality of network tenants for the at least one policy manager in at least one policy storage unit at the NAC system.

16. The method of claim 9, wherein servicing the authentication request from the NAS device using the selected authentication server instance comprises providing, at the NAC system, RADIUS (Remote Authentication Dial-In User Service) service using the selected authentication service instance to the NAS device, wherein the secure tunnel is a RADSEC (RADIUS over TLS) tunnel.

17. A computer-readable storage medium comprising instructions that, when executed, cause one or more processors of a cloud-based network access control (NAC) system in communication with a cloud-based network management system (NMS) to:
manage one or more groups of authentication server instances, wherein each group includes a plurality of authentication server instances and is assigned a set of network tenants of a plurality of network tenants, and wherein each instance within a group has a same set of configuration files for the set of network tenants assigned to the group;
receive, by a tunnel terminator of one or more tunnel terminators at the NAC system, an authentication request via a secure tunnel from a network access server (NAS) device associated with a network tenant of the plurality of network tenants, the request including an indicator to identify the network tenant to which the NAS device belongs;

determine, by the tunnel terminator and based on the indicator identifying the network tenant, the group of authentication server instances to which the network tenant is assigned;
send, by the tunnel terminator, the authentication request to the group of authentication server instances to which the network tenant is assigned;
select, for the authentication request and based on a load balancing scheme for load balancing authentication requests among the plurality of authentication server instances within the group, an authentication server instance of the plurality of authentication server instances within the group; and
service the authentication request from the NAS device using the selected authentication server instance.

18. The computer-readable storage medium of claim 17, further comprising instructions that, when executed, cause the one or more processors to:
generate a mapping of each network tenant of the plurality of network tenants to a particular group of the one or more groups of authentication server instances;
update a configuration of each tunnel terminator of the one or more tunnel terminators with the mapping; and
update each authentication server instance within the particular group to include configuration files for each network tenant of the set of network tenants assigned to the particular group.

19. The computer-readable storage medium of claim 17, further comprising instructions that, when executed, cause the one or more processors to:
in response to receipt of an authentication request from a NAS device associated with a new tenant, select a group from the one or more groups of authentication server instances to which to assign the new tenant based at least on load levels at each of the one or more groups; and
periodically scale a number of groups or a number of authentication server instances within the group to accommodate changes in the load levels at the one or more groups.

20. The computer-readable storage medium of claim 17, wherein the network tenant comprises a first network tenant in the set of network tenants assigned to the group, wherein the set of network tenants assigned to the group includes the first network tenant and a second network tenant of the plurality of network tenants, and further comprising instructions that, when executed, cause the one or more processors of the cloud-based NAC system in communication with the cloud-based NMS to:
service a second authentication request from a NAS device associated with the second network tenant using a second selected authentication server instance of the plurality of authentication services instances within the group.

\* \* \* \* \*